United States Patent
Wendling (10) Patent No.: US 10,091,537 B2
(45) Date of Patent: Oct. 2, 2018

(54) METHOD AND MULTIMEDIA UNIT FOR PROCESSING A DIGITAL BROADCAST TRANSPORT STREAM

(71) Applicant: NAGRAVISION S.A., Cheseaux-sur-Lausanne (CH)

(72) Inventor: Bertrand Wendling, Divonne-les-Bains (FR)

(73) Assignee: Nagravision S.A., Cheseaux-sur-Lausanne (CH)

(*) Notice: Subject to any disclaimer, the term of this patent is extended or adjusted under 35 U.S.C. 154(b) by 165 days.

(21) Appl. No.: 14/354,975

(22) PCT Filed: Oct. 5, 2012

(86) PCT No.: PCT/EP2012/069693
§ 371 (c)(1),
(2) Date: Apr. 29, 2014

(87) PCT Pub. No.: WO2013/064325
PCT Pub. Date: May 10, 2013

(65) Prior Publication Data
US 2014/0304728 A1    Oct. 9, 2014

Related U.S. Application Data

(60) Provisional application No. 61/553,271, filed on Oct. 31, 2011.

(30) Foreign Application Priority Data

Oct. 31, 2011    (EP) .................................... 11187260

(51) Int. Cl.
*H04N 21/2347*    (2011.01)
*H04N 21/266*    (2011.01)
(Continued)

(52) U.S. Cl.
CPC ... *H04N 21/2347* (2013.01); *H04N 21/25816* (2013.01); *H04N 21/26609* (2013.01);
(Continued)

(58) Field of Classification Search
CPC ............. H04N 21/4623; H04N 21/633; H04N 21/6334; H04N 21/26609; H04N 21/60;
(Continued)

(56) References Cited

U.S. PATENT DOCUMENTS 8,615,650 B2    12/2013    Magis
2006/0020786 A1    1/2006    Helms et al.
(Continued)

FOREIGN PATENT DOCUMENTS

FR    2 954 875    7/2011

OTHER PUBLICATIONS

International Search Report issued in International Application No. PCT/EP2012/069693 dated Nov. 9, 2012.
(Continued)

*Primary Examiner* — Benjamin R Bruckart
*Assistant Examiner* — Akshay Doshi
(74) *Attorney, Agent, or Firm* — DLA Piper LLP US (57) ABSTRACT

A method of managing the processing of a digital broadcast transport stream by a multimedia unit identified by a personal identifier. The multimedia unit being connectable to a security module associated to the multimedia unit and/or a server through an IP-connection with a return path. The transport stream comprising scrambled content packets and conditional access messages that are necessary for descrambling the content packets. The method comprises: sending the conditional access messages from the multimedia unit to either the server or the security module; verifying the authentication of the multimedia unit and/or the validity of access rights allocated to the multimedia unit; if the authen-
(Continued)

tication fails, preventing any further processing of the conditional access message; securely obtaining, at the multimedia unit, the control data corresponding to the conditional access messages; and descrambling the audio/video/data content packets using the control data at the multimedia unit.

15 Claims, 2 Drawing Sheets

(51) Int. Cl.
      *H04N 21/258*     (2011.01)
      *H04N 21/418*     (2011.01)
      *H04N 21/6377*   (2011.01)
      *H04N 21/61*      (2011.01)
      *H04N 21/435*     (2011.01)
      *H04N 21/437*     (2011.01)

(52) U.S. Cl.
    CPC ....... *H04N 21/4181* (2013.01); *H04N 21/437* (2013.01); *H04N 21/4353* (2013.01); *H04N 21/6175* (2013.01); *H04N 21/63775* (2013.01)

(58) Field of Classification Search
    CPC ............. H04N 21/63; H04N 21/26606; H04N 21/436; H04N 21/418; H04N 7/1675; H04N 7/17318; H04N 7/165
    See application file for complete search history.

(56) References Cited

U.S. PATENT DOCUMENTS

| | | | |
|---|---|---|---|
| 2008/0301437 A1 | 12/2008 | Chevallier et al. | |
| 2010/0332829 A1* | 12/2010 | Baroffio | G06F 21/554 713/168 |
| 2011/0010735 A1* | 1/2011 | Newell | H04N 7/20 725/31 |
| 2011/0030065 A1* | 2/2011 | Kulakowski | H04N 21/6334 726/26 |
| 2011/0107080 A1* | 5/2011 | Ohbitsu | H04N 7/17318 713/150 |
| 2012/0008781 A1 | 1/2012 | Chevallier et al. | |
| 2012/0290831 A1* | 11/2012 | Magis | H04L 9/083 713/150 |
| 2013/0046969 A1* | 2/2013 | Dubroeucq | H04N 21/631 713/150 |

OTHER PUBLICATIONS

Written Opinion issued in International Application No. PCT/EP2012/069693 dated Nov. 9, 2012.
English language abstract of FR 2 954 875, published Jul. 1, 2011.
Chinese Office Action issued in counterpart Chinese Application No. 201280053994.2 dated Sep. 13, 2016; with English Translation.

* cited by examiner

Fig. 2c

METHOD AND MULTIMEDIA UNIT FOR PROCESSING A DIGITAL BROADCAST TRANSPORT STREAM

CROSS-REFERENCE TO RELATED APPLICATIONS

This application is a National Stage of International Application No PCT/EP2012/069693, which claims priority to U.S. Provisional Patent Application No. 61/553,271 filed Oct. 31, 2011 and European Application No. 11187260.2 filed Oct. 31, 2011.

TECHNICAL FIELD

The present invention relates to reception of multimedia data such as encrypted TV events for Pay-TV systems. More particularly, the invention relates to a method and to a hybrid multimedia unit, such a set-top-box or a portable device, for descrambling a digital transport stream received from a broadcaster through a satellite, terrestrial, handheld or cable network. The hybrid feature of this multimedia unit means that it is connectable, on the one hand, to a server through an IP-connection provided with a return path in order to receive events broadcasted via Internet means (e.g. IPTV) and, on the other hand, via at least one another wire or wireless network, for instance by means of a satellite (SAT), a cable (CATV), a terrestrial (DTT) or a handheld device such as a smart phone or a tablet computer.

BACKGROUND

A digital transport stream typically comprises scrambled audio/video/data content packets and scrambled conditional access messages (ECM, EMM) which have to be processed in order to extract control data (CW); the latter being necessary for the multimedia unit to descramble the content packets relating to the event (e.g a broadcasted program or a set of programs). Conditional access messages include two kinds of information, namely Entitlement Control Messages (ECM) and Entitlement Management Messages (EMM). The ECM is information relating to content packets, whereas the EMM is information dedicated to an individual end user (subscriber) or a group of end users. The ECM contains the access conditions for the current broadcast event together with control word (CW) for unscrambling this event. The Control Word (CW) is a key used for decrypting content packets of a packetized event broadcasted within the data stream. Thus, each ECM is specific to each event (e.g. a TV program). The EMM is a message used typically by the security module to set, reset or change product access entitlements, credit, etc. . . . Thus EMM refers to the rights (access data) of the subscriber for accessing to the content (events).

There is two main types of set-top-boxes known by the prior art. The first type comprises set-top-boxes that can generally receive broadcast unencrypted events, and which therefore do not require any access control. As internet access is widespread at user homes, such set-top-boxes are increasingly provided with an IP-connection which allows the end user to use his set-top-box together with his television screen as a terminal for internet facilities.

The second type refers to set-top-boxes provided each with a security module. These set-top-boxes are typically used by Pay-TV systems for processing selective access to broadcast services on a per-subscriber basis managed by a conditional access system (CAS). Such a security module typically refers to a smart card (chip card) which can be inserted into a slot of a conditional access reader. This card reader can be connected to the multimedia unit or be lodged directly within this unit. Thus, the security module becomes a necessary device for decrypting the scrambled content packets of the digital transport stream. To this end, the conditional access messages contained in the transport stream are routed to the security module which has the keys to decrypt the ECM in order to extract the control word (CW) which then will be used by a descrambling module (within the multimedia unit) for descrambling the content packets. This process is achieved only if the conditional access rights (provided by the EMM) are valid and checked by the security module.

The problem with set-top-boxes of the first type is that they are often unsuitable for processing conditional access messages required for descrambling audio/video content packets within a Pay-TV environment. This is true even if they are provided with an IP-connection. Thus, a user wanting to subscribe a subscription for having access to Pay-TV programs has to change his set-top-box with another one that supports conditional access processing.

On the other hand, the set-top-boxes of the second type, provided with a security module, are dependent on this module for descrambling the content packets of the transport stream. It means that the security module of the set-top-box is required for descrambling purposes. If this security module becomes unavailable (for instance because the required smart card has to be changed to a renewal or for any other reasons), this set-top-box becomes at least temporarily unavailable for receiving Pay-TV programs.

Accordingly, there exists a need for improving processes and multimedia units (e.g. set-top-boxes) in order to optimize the processing of control data for descrambling the content packets of the transport stream, for instance by adapting this processing to different circumstances, depending on the availability and the adequacy of the network and/or depending on the material configuration at the end user.

SUMMARY OF THE INVENTION

In order to solve this problem, the present invention suggests managing the processing of a digital broadcast transport stream through a selection process that allows redirecting conditional access messages according to several possible scenarios.

This aim is reached by a method for managing the processing of a digital broadcast transport stream received, from a broadcaster through a wire or wireless network, by a multimedia unit. This multimedia unit is identified by a personal identifier and is connectable to a security module associated to the multimedia unit, typically through a local secure connection. This multimedia unit is also connectable to a server through an IP-connection. This IP-connection is not only provided with a download path but it is also provided with a return path (upload path). The transport stream comprises scrambled audio/video/data content packets and scrambled conditional access messages. These conditional access messages have to be processed to obtain control data which are necessary for descrambling the content packets. This method comprises the steps of:

sending the conditional access messages, for their processing, from the multimedia unit, either to the server through said return path, or to the security module, depending on a selection command, verifying the authentication of the multimedia unit and/or the validity of access rights allocated to the multimedia unit; if this authentication fails or if these allocated rights are not valid, then preventing any further processing of the conditional access message, securely obtaining, at the multimedia unit, the required control data corresponding to these conditional access messages, descrambling the audio/video/data content packets by means of control data; this operation being performed at the multimedia unit.

The aim of the present invention is also reached by a multimedia unit comprising the following means:

a receiving unit for receiving the aforementioned digital broadcast transport stream;

an interface for providing an IP-connection with a return path for connecting the multimedia unit to a server;

a security module which can be used for processing the conditional access messages and extracting the control data (control words) thereof;

securing means for securely transferring data between the multimedia unit and the server;

a sending unit for sending the conditional access messages to a processing unit; this processing unit being, either the server, or the security module;

a switching unit for selecting the appropriate processing unit in accordance with a selection command;

a receiving unit for securely receiving the control data from the server through the IP-connection;

a descrambling unit for processing the control data in order to descramble the content packets.

BRIEF DESCRIPTION OF THE DRAWINGS

The present invention will be better understood thanks to the attached figures in which.

DETAILED DESCRIPTION

Figure 1:
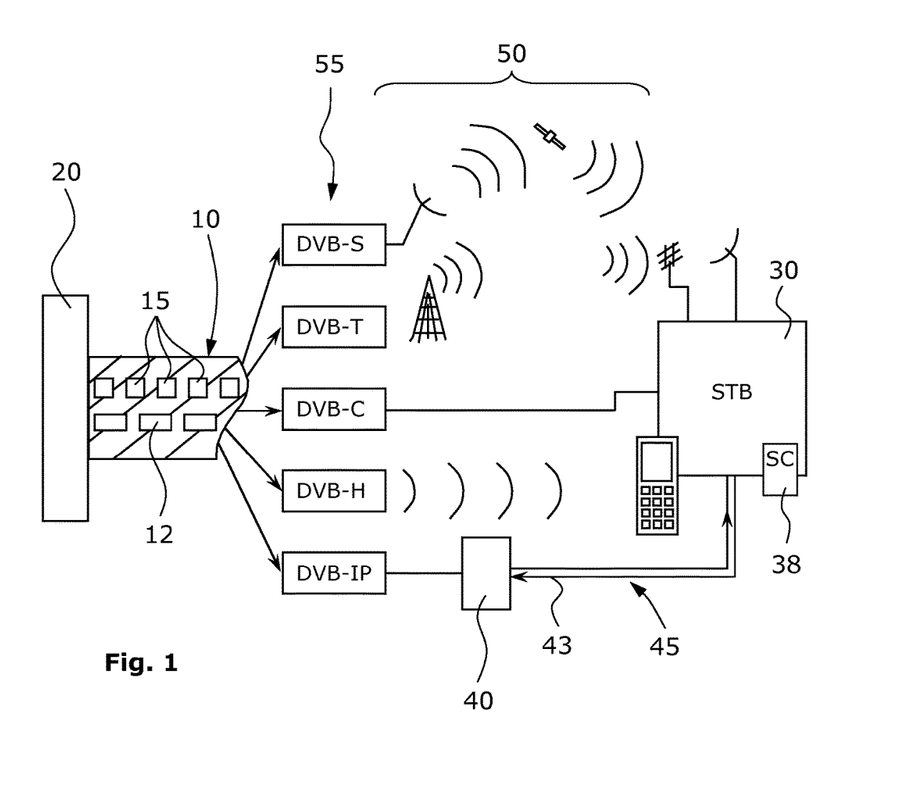
FIG. 1 shows a schematic overview of means for broadcasting a multimedia transport stream and a multimedia unit for receiving this transport stream via different types of possible networks.

Referring to FIG. 1, it illustrates the general environment of the present invention in which at least one transport stream 10 of multimedia data (mainly audio/video data) is broadcasted by at least one broadcaster 20 (also denoted as being a head-end). This transport stream 10 is designated to be received by a multimedia unit 30 in view to be played and/or displayed on an appropriate means (e.g. TV or handheld display and/or audio means), connected to this multimedia unit. This multimedia unit can be as a set-top-box (digital video receiver) or a handheld device (e.g. a mobile phone or any other portable device). It is identified by a personal identifier.

One of the features of the present invention is that this multimedia unit is on the one hand connectable to a server 40, through an IP-connection 45 provided with a return path 43, and on the other hand connectable to at least one another type of networks 50. Thus, the multimedia unit is potentially able to receive data of the transport stream 10, through different ways. This feature allows defining the multimedia unit 30 as a hybrid multimedia unit. Moreover, data may be supplied either by one transport stream or by transport streams coming from one or several head-ends.

Among the networks 50, which can be wire or wireless networks, the FIG. 1 schematically shows a satellite network, a terrestrial network, a cable network and a handheld network, each implemented by a modulator 55, respectively denoted DVB-S, DVB-T, DVB-C and DVB-H with reference to Digital Video Broadcasting standards. Each modulator 55 is used for converting the incoming transport stream 10 into a modulated stream suitable for its transport towards the receivers. The designation DVB-IP refers to the Digital Video Broadcasting standard implying Internet Protocol and the designation DVB-H refers to mobile broadband Internet access for cellular phones including mobile TV receivers.

Within the context of a Pay-TV or any other paid service, the transport stream 10 is broadcasted in a scrambled form, so that only authorized end users (i.e. subscribers) are allowed to descrambled this stream for retrieving its original content (audio/video/data events). The scrambled transport stream 10 comprises a plurality of audio/video/data content packets 15 together with conditional access messages 12. A transport stream generally comprises several events, typically a plurality of TV programs of different channels. Each content packet 15 is attached to a certain event by means of a specific header. Each conditional access message 12 may comprise an ECM (Entitlement Control Message), an EMM (Entitlement Management Message) or another message containing at least a particular command or specific information.

According to the present invention, the multimedia unit 30 is associated to a security module 38 which can be in charge of processing the access conditional message 12. For processing security operations, this security module can be realized in different forms.

The first form of security module consists in a microprocessor card, a smart card, or more generally an electronic module (taking the form of a key, of a badge, etc. . . . ). This type of module is generally removable and connectable to the digital video recorder. The most used form is the one with electric contacts, but does not exclude a connection without contact, for example of the ISO 14443 type.

A second known form consists in an integrated circuit chip, generally placed in the digital video receiver printed circuit board in a definitive and irremovable way. An alternative is made up of a circuit wired on a base or connected such as a SIM module connector.

In a third form, the security module is integrated into an integrated circuit chip that also has another function, for example in a descrambling module of the decoder or the microprocessor of the receiver. The security module is therefore a portion of a larger Silicon circuit.

In a fourth embodiment, the security module is not realized in a hardware form, but its function is implemented in a software form only. This software can be obfuscated within the main software of the receiver.

Given that in the four cases the function is identical, although the security level differs, we will refer to the security module in whichever way appropriate to realize its function or the form that can take this module. In the four designs described above, the security module has the means for executing a program (CPU) stored in its memory. This program allows the execution of the security operations, verifying the rights, effecting a decryption or activating a decryption module etc.

Conditional access messages allow to verify the rights of the subscriber by processing the EMM and to descramble the content packets 15 after extracting the control word CW from the ECM. In the present invention, such processing is achieved either by the server 40 or by the security module 38, depending on a selection command.

According to a preferred embodiment of the present invention, the first step of the method refers to handling the conditional access messages 12, as soon as they are received by the multimedia unit. To this end, these conditional access messages are sent, for their processing, from the multimedia unit 30 to a processing unit. Preferably, these conditional access messages are sent with the personal identifier of the relevant multimedia unit, so that the recipient can identify the sender. This processing unit can be either the server 40, or the security module 38. In case where the multimedia unit sends the conditional access messages to the server 40, the return path 43 is used as communication means for routing these messages to the server. As these condition access messages have been already scrambled by the broadcaster, there is no specific requirement to over-encrypt them. Advantageously, the multimedia unit 30 can just forward them to the server through a common return path 43. On the other hand, in case where the multimedia unit sends the conditional access messages 12 to the security module, such an operation does not requires specific features given that the security module is already associated to the multimedia unit in a secure manner (whatever the form of the security module). Thus, the data transmission between the multimedia unit and the security module is considered as being a fully secure communication (i.e. a tamper proof communication).

The selection (i.e. the choice) between the server 40 and the security module 38 for sending the conditional access messages can be undertaken by the multimedia unit itself, by the broadcaster 20 or the server 40, or even by another device such as the security module. This selection depends on a selection command which can be generated by one of the aforementioned devices (multimedia unit, broadcaster, server, security module) and this command is defined on the basis of at least one criterion, as it will be explained later.

Another step of the present method refers to verifying the authentication of the multimedia unit and/or the validity of access rights allocated to this multimedia unit 30. This step aims to check if the multimedia unit is recognized (e.g. through its personal identifier) as a genuine unit and/or to ensure that all required rights assigned to the end user (e.g. via EMMs sent to the multimedia unit) are still valid. If this authentication fails or if the allocated rights are not valid, then appropriate measures can be undertaken in order to prevent any further processing of the conditional access message 12.

Although this step is the second step carried out in accordance with the present invention, it may be also performed as a first step or even simultaneously with sending the conditional access messages from the multimedia unit.

To perform the authentication of the multimedia unit 30 by the server 40, the latter may use the personal identifier number (ID) of the multimedia unit. This identifier can be sent, e.g. at regular intervals, by the multimedia unit to the server during the authentication step. Preferably, it can be sent together with the conditional access messages when they have to be processed by the server. Then, the server can check that the personal identifier assigned to the multimedia unit is registered as an authorized identifier, for instance by querying a database storing all authorized or revoked personal identifiers of the multimedia units. As it will be suggested later, other manners to perform the authentication of the multimedia unit can be performed by the server. The purpose of this step is to prevent any unauthorized multimedia unit to have access to the services of the server (for extracting the control words from the conditional access messages). If this authentication fails, then any access to the server by an unauthorized multimedia unit 30 for processing conditional access messages 12 could be denied.

Once identified as authorized multimedia unit, the multimedia is authorized to securely obtain control data 13 extracted from the corresponding conditional access messages 12. Typically, these control data 13 are control words, each used as a key for a descrambling operation within the multimedia unit. Upon receipt of these control data by the multimedia unit, this unit is finally able to descramble the content packets 15 of the transport stream in a last step.

According to one embodiment, the selection command is determined and sent by the server 40 and/or by the broadcaster 20 to the multimedia unit. In order to be transmitted to the multimedia unit, the selection command can be included in the conditional access messages 12, attached to these messages or it can be part of another specific message, e.g. within an independent packet (i.e. separately from the conditional access messages).

According to another embodiment, the selection command can be encrypted with a specific encryption key and then sent to one particular multimedia unit (or to a group comprising a limited number of specific multimedia units) that is able to decrypt the encrypted selection command, e.g. according to a symmetric or asymmetric encryption scheme. Once decrypted, the selection command can be either directly used by the multimedia unit or stored in a memory of this unit for a latter use.

This selection command can correspond to the current or the future operating state of the server or the broadcaster. For instance, a selection command corresponding to the value 1 can mean that the sender (i.e. the server or the broadcaster) is fully operational, whereas a selection command carrying a zero will mean that the sender is out of order or unavailable. This availability could also refer to the network 50, in particular to the modulator 55. Thus, the selection command may also be representative of the availability of one of the modulators 55. Thus, in case where one of the modulators 55 is unavailable, this information can be communicated to the multimedia unit through such a selection command, either via the server 40 or via one of the other channels of the network 50, depending on the available connections between the broadcaster and the multimedia unit.

The selection command can also depend on the current operating state of the security module. For example, the conditional access messages 12 can be sent to the security module 38 upon their receipt by the multimedia unit. In case this security module is unavailable or is unable to process these messages 12 for extracting the control data 13 (control words), this security module can generate a new selection command or it can modify the current selection command (i.e. the value or other information contained in the current selection command) and send back the conditional access messages to the multimedia unit. Thus, the multimedia unit (e.g. a switching unit) can resend the conditional access messages 12 to the server 40 instead of sending them to the security module 38.

In any cases, the selection command is not limited to binary information, but it can further include other addition data. For instance, this selection command can further comprise the identifier of the sender (e.g. the ID of the broadcaster or the ID of the server), information referring to the modulator 55 (e.g. for identifying which communication network 55 is concerned by this selection command), information about an activating deadline (a time interval or data referring to date and time) e.g. for instructing the multimedia unit when this selection command has to be used for switching purposes (i.e. for switching between the security module and the server).

According to another embodiment, the selection command can be determined by the multimedia unit itself, for instance on the basis of available or unavailable communication channels through which the transport stream 10 can be delivered to the multimedia unit, or on the basis of the availability of the security module associated to the multimedia unit.

The selection command (more specifically the value or information contained in this command) can also depend on the adequacy of the network 50, in particular the adequacy of the transmission between any of the modulators 55 and the multimedia unit 30, for receiving the transport stream 10. The adequacy of the network is not limited to the availability of the communication, but it can also refer to the quality of the transmission through this network. For instance, the multimedia unit 30 according to the present invention could be connected to the broadcaster, via a satellite channel (DVB-S) and via an IP-connection (DVB-IP). Sometimes, due to bad weather conditions, the reception via satellite can be not optimal (or it can be even poor) and the image quality (in case of TV-broadcast) at the receiver may be relatively affected. Therefore, the user can be incommoded when viewing TV programs under such conditions and this situation is particularly annoying when the user has to pay for viewing TV. Owing to the present invention, the multimedia unit can receive a selection command that will switch the reception of the transport stream from the wireless satellite channel to the wire IP-connection, in order to increase the image quality. According to another situation, the switching can be ordered to optimize the computer resources or to regulate the data transmitted through the IP-network, for example when the IP-connection is overloaded.

In case where the server 40 becomes unavailable, for maintenance purpose or for any other reasons, the selection command can order the multimedia unit to switch the routing of the incoming conditional access messages 12 so that their processing is performed by the security module 38.

According to another embodiment, the multimedia unit can store a table provided with one or a plurality of records, each referring to a multimedia program channel broadcasted by the broadcaster 20 (via any modulator 55). Each of these records can include a channel identifier (e.g. the channel number of the multimedia program) referring to a broadcast program which can be received by the multimedia unit. This record also includes a relevant selection command, namely a selection command which is associated to the channel identifier of this record. Thus, when the user selects a specific program channel, for instance a TV-channel, the multimedia unit firstly queries the table in order to find the selection command associated to the selected TV-channel (through the channel identifier) in the relevant record. In other words, when the multimedia unit receives conditional access message 12 which refers to a specific broadcast program, it queries the table for finding the record comprising the channel identifier corresponding to said broadcast program and if it find it, then it uses the corresponding selection command stored in this record as a new selection command to be taken into account. This selection command is then processed by the multimedia unit (in particular by a switching unit within the multimedia unit) in order to route the conditional access messages 12 to the appropriate processing unit, namely the server 40 or the security module 38.

The table can be specific to each multimedia unit or can be the same for a group of multimedia units, e.g. for a plurality of multimedia units sharing the same rights or located within a particular geographical area. Such a table can be updated and populated by means of subsequent specific messages received by the multimedia unit (e.g. from the broadcaster or from the server).

Figure 2A:
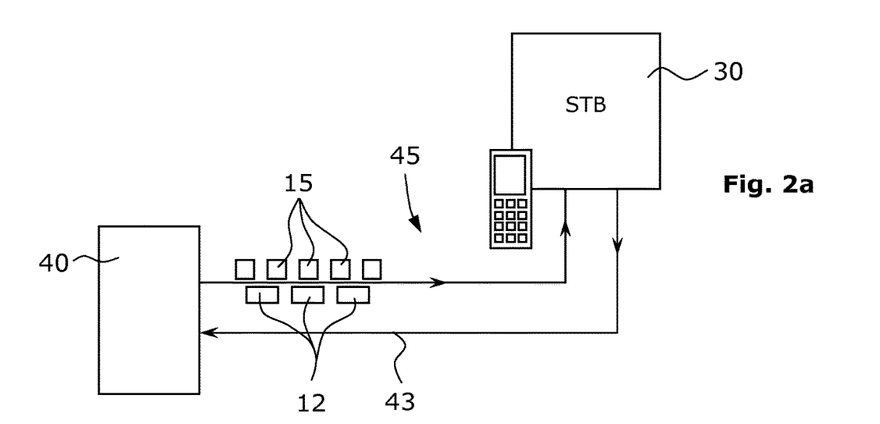
FIG. 2a, FIG. 2b and FIG. 2c refer to a portion of the FIG. 1 and show exchange data between the multimedia unit and the server.
Figure 2B:
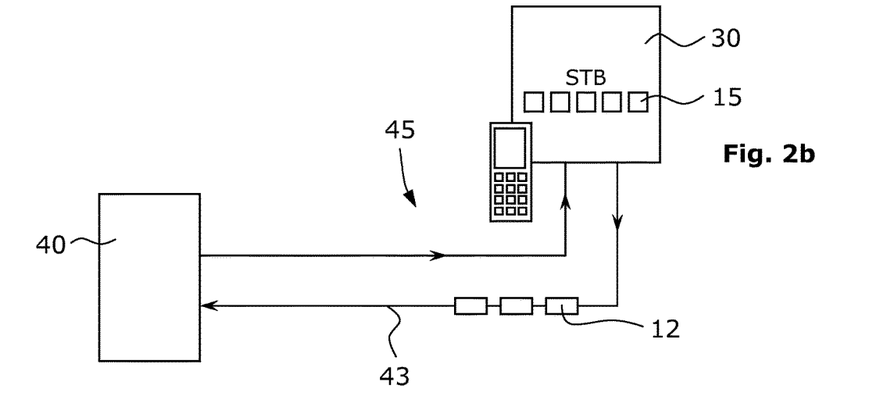
Figure 2C:
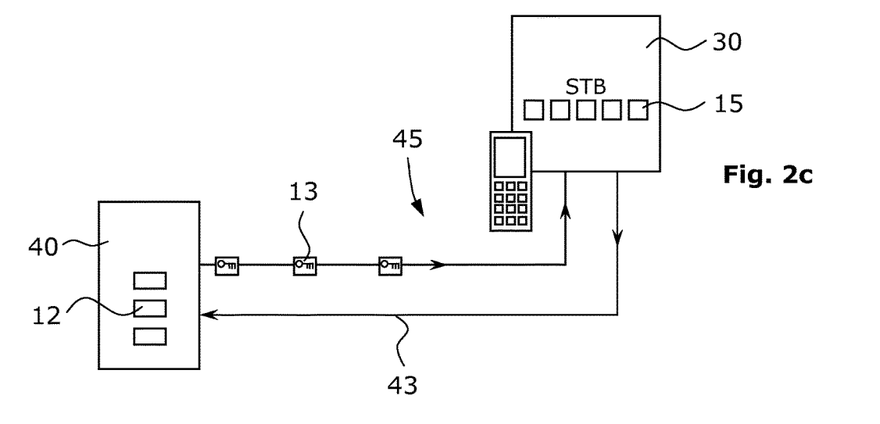

Referring now to FIGS. 2a to 2c, these figures illustrate data exchange performed between the multimedia unit 30 and the server 40, on the one hand for receiving content packets 15 of the transport stream and on the other hand for processing the conditional access messages 12.

The first illustration provides by FIG. 2a refers to the IP-connection 45 of FIG. 1 which links the multimedia unit 30 to the server 40. The latter sends the audio/video/data content packets 15 together with the conditional access messages 12 to the multimedia unit 30 through the download path of the secured IP-connection.

According to one embodiment of the present invention, the multimedia unit holds the audio/video/data content packets 15, received from the server (FIG. 2a) or from the broadcaster via any other channel (FIG. 1), and it uses the return path 43 for sending back the conditional access messages 12 from the multimedia unit towards the server in order to process them by the latter. This is illustrated by FIG. 2b which shows that the conditional access messages 12 are sent (back) to the server without having processed them before by the multimedia unit 30, i.e. without extracting the control words CW from these messages, in particular from the ECM.

The extraction of control data is achieved by the server 40 after having verified the validity of the subscriber rights contained in the EMM. This verification is made on the server side, by means of the messages sent (back) by the multimedia unit through the return path 43.

As shown in FIG. 2c, the extracted control data 13 are sent by the server 40 towards the multimedia unit 30, via the secured channel 45. These control data include the control words CW which are used by the descrambler of the multimedia unit for descrambling the scrambled content packets 15. Then, these packets 15 are processed generally by an MPEG decoder (within the multimedia unit) before the output signal (clear and decompressed) can be played or displayed on an appropriate means for the end user.

By selecting the server via the selection command, it should be noted that all the operations usually processed by the security module within the area of the multimedia unit are now advantageously moved to the server side. Due to the fact that the server 40 is able to process conditional access messages coming from many multimedia units and given that the control words are not dependent from the multimedia unit but are linked to the scrambled stream, therefore the same control words can be used simultaneously by several multimedia units. In order to increase the processing speed of the conditional access messages at the server, the latter can store the control words in an internal secured memory in view to be retrieved and used by other multimedia units for descrambling the same content packets 15. Therefore, according to one embodiment of the present invention and in case conditional access messages are processed by the server, each control data 13 is obtained firstly by retrieving it from a storing means in which it has been recorded by the server 40 during a previous processing of a same conditional access message 12, then by securely transmitting the retrieved control data 13 to the multimedia unit 30 through said IP-connection 45 (via its download path).

Assuming that the server is a secured trusted server, it could store several flows of control words used for decrypting several flows of content packets (e.g. events such as video movies) in view to easily restore them to other multimedia units. Advantageously, retrieving control data 13 from a storing means at the server allows, on the one hand, saving computing resources of the server and, on the other hand, to speed-up the processing of the conditional access message, in particular the extraction of the control words from the ECM.

When the conditional access messages 12 are still processed by the server 40, the authentication of the multimedia unit 30 can alternatively be performed by joining, to the conditional access messages sent to the server, a digital signature of these messages and a digital certificate belonging to said multimedia unit. The digital signature of a message can be obtained firstly by generating a digest of the message, by means of a hash function, and then by encrypting this digest by means of a private key belonging to the multimedia unit. This digital signature is sent with the corresponding conditional access message to the server which can decrypt the digest by means of the public key of the multimedia unit. Thanks to a trusted certification authority, the server can verify the authenticity of the digital certificate and can therefore check the authenticity of the public key of the multimedia unit. The server can use this public key to decrypt the digital signature and thus to obtain the digest. In order to check the integrity of the message, the server can use the same hash function to determine a second digest from the message received from the multimedia unit. If the comparison of these two digests shows that they are identical, the server is certain that the conditional access message 12 comes from the right multimedia unit and that it has not been modified, for instance by a hacker.

Additionally, the server could also check if the digital certificate received from the multimedia unit is not comprised in a database which stores revoked digital certificates. Such a database can be located at the server or outside this server (e.g. at the certification authority).

Alternatively and as suggested before, verifying the authentication of the multimedia unit 30 can be performed by checking if the personal identifier of the multimedia unit is registered, at the server, as an authorized or unauthorized identifier. In case where the personal identifier is registered as being valid at the server, the latter can encrypt the control data 13 (required by the multimedia for descrambling the content packets 15) by means of the public key of the relevant multimedia unit before to sent the encrypted control data to this multimedia unit. Then, this unit can use its private key for decrypting the encrypted control data in order to obtain the required control words. According to this scheme, the server can store in its database a record for each authorized multimedia unit. This record comprises both the personal identifier of the multimedia unit and its public key. These data can be obtained, for instance, during the registration step.

Registering the personal identifier (e.g. a unique number) belonging to the multimedia unit, can be done by storing this identifier in the database of the server (e.g. with the above-mentioned record) during a registration stage. To this aim, the personal identifier can be transmitted, during said registration stage, from the multimedia unit 30 to the server 40 by means of a communication device connectable to the server. This communication device can be a personal computer, a smart phone, a tablet computer or any other device connectable by any means to the server, preferably also connectable to the multimedia unit.

According to one embodiment, the personal identifier is provided to the server by the multimedia unit, through a displaying device and then it is manually transmitted to this server by means of the aforesaid communication device. Thus, the multimedia unit could read its own personal identifier in order to display it for instance on a TV screen or on any other fixed or portable display means (e.g. on a smart phone display, on a remote control display, on a tablet computer display etc. . . . ) connected to the multimedia device. Then, this personal identifier could be transmitted to the server, e.g. by means of a personal computer connected to the server through Internet during a registration stage. Alternatively, this personal identifier could be automatically transmitted (during this registration stage) from the multimedia unit to the server through the return path 43. In this case, displaying this identifier on a screen becomes optional.

According to another embodiment, the personal identifier is generated by the server and transmitted to the multimedia unit through the IP-connection 45 during the registration stage. In this case, the personal identifier, or any similar identifier used for identifying the multimedia unit at the server, is assigned by the server to the multimedia unit.

Whatever the embodiment chosen during the registration stage and if an asymmetric scheme is used for securely transmitting the control data from the server to the multimedia unit, the public key belonging to the multimedia unit can be sent together with its personal identifier in view to be recorded in the database of the server.

In a further embodiment, the above-mentioned registration stage can be subject to authorization delivered by the server.

Obtaining a secure connection, for securely transferring or securely receiving data, can be achieved through several manners, e.g. by means of encryption keys (session key, shared key, pair of private/public keys, depending on the encryption scheme), by establishing a secured session or a secured channel.

Figure 3:
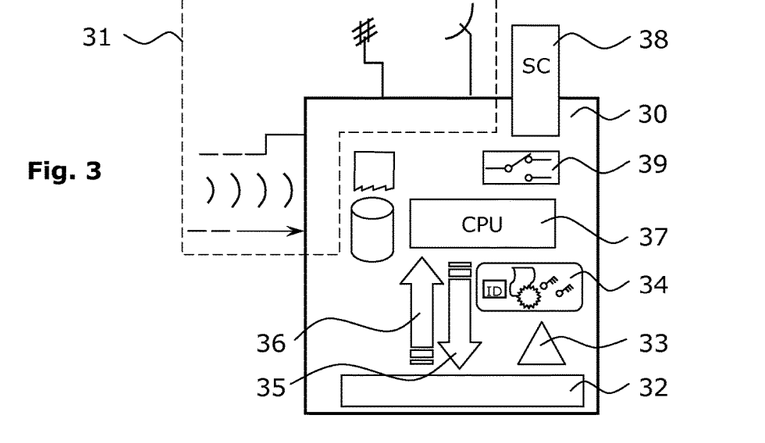
FIG. 3 is a schematic representation of a multimedia device according to the invention.

To implement the method of the present invention, the FIG. 3 discloses a multimedia unit 30 comprising:

- a receiving unit 31 for receiving a digital broadcast transport stream 10 which includes scrambled audio/video/data content packets 15 and scrambled conditional access messages 12 sent by a broadcaster 20 (head-end) through a wire or wireless network; this receiving unit refers to any receiving means able to receive a data stream through an IP-connection and at least a satellite, a terrestrial, a cable or a handheld communication means,
- an interface 32 for providing an IP-connection 45 with a return path 43 for connecting the multimedia unit 30 to the server 40,
- a security module 38 able to process the conditional access messages 12 for extracting the control data 13 thereof,
- securing means, such as a securing unit 34 an securing tools, for securely transferring data between the multimedia unit 30 and the server 40,
- sending means, such as a sending unit 35, for sending the conditional access messages 12 (e.g. ECM, EMM) to a processing unit which is either the server 40 or the security module 38,
- switching means, such as a switching unit 39, for selecting the processing unit (40 or 38) in accordance with a selection command, receiving means, such as a receiving unit 36, for securely receiving the control data 13 (typically the control words CW) from the server 40 via the IP-connection 45 (and through the interface 32), and processing means, such as a descrambling unit 37, for processing the control data 13 in order to descramble the content packets 15.

According to another embodiment, the multimedia unit further comprises authenticating means 33, such as an authentication unit, for preparing authenticating information (such as digital certificate, signature, personal identifier, etc. . . . ) to be sent to the server 40.

Other components, such as databases and other storing means could be obviously accommodated in the multimedia unit, as schematically shown in FIG. 3. Besides, the multimedia unit 30 is not limited to a set-top-box but could be any suitable device able to process a digital transport stream such as a pocket or a tablet PC, a personal assistant, a game console, or a smart phone for instance.

Although the server 40 is shown in the attached figures as an independent entity separated from the broadcaster 20, this server could be located within the broadcaster (head-end) or could be substituted by the latter.

Besides, although the conditional access messages 12, exchanged between the server and the multimedia unit, are preferably sent back to the server through a secured IP-connection, it may be also possible to send them through an unsecured channel given that they are already encrypted (since the control data 13 are not extracted by the security module in this case). In contrast, the sending of control data 13 will still be achieved in a secured manner, for instance in an encrypted form through a secured channel.

Alternatively, the return path 43 could be also implemented by using a modem and a telephone network or a cable return.

By processing the conditional access messages at the server, instead of within a security module (i.e. at the end user), it is possible to easily check which program (event) is played or displayed by each multimedia unit. That allows introducing audience ratings, to track the behaviors of the subscribers and to prevent any unauthorized control words sharing. Such control word sharing may be implemented by attackers by using a prohibited multimedia unit with a packet sniffer (communication analyzer) for grabbing the control words and redistribute them, via internet, to unauthorized multimedia units.

The present invention allows to benefit a hybrid reception and to automatically manage different receiving ways, depending on criteria which are generally independent from the user behavior. This invention also avoids the requirement of two multimedia units in parallel in order to benefit a hybrid reception, i.e. one unit provided with a common security module for processing transport stream via a satellite, a terrestrial or a cable network and a second multimedia unit without said module but specifically dedicated to be connected to Internet network.

The invention claimed is:

1. A method for managing a processing of a digital stream received by a multimedia device identified by a personal identifier, from a source through a wired or wireless network said multimedia device being connectable to a security module associated with the multimedia device through a local secure connection, said multimedia device being connectable to a server through an IP-connection provided with a return path, said stream comprising scrambled audio/video/data content packets and scrambled conditional access messages, said conditional access messages having control data necessary for descrambling said content packets, the method comprising the steps of:

generating, by the multimedia device or by the security module, a selection command, the selection command indicating that the conditional access messages have to be sent to the security module when a connection to the server is not available or is not adequate, and the selection command indicating that the conditional access messages have to be sent to the server when a connection to the security module is not available;

sending said conditional access messages from the multimedia device to the server through said return path or to the security module depending on said selection command;

verifying the authentication of the multimedia device and/or the validity of access rights allocated to said multimedia device and if said authentication fails or if said allocated rights are not valid, preventing any further processing of said conditional access message;

securely obtaining, at the multimedia device, said control data corresponding to said conditional access messages; and descrambling said audio/video/data content packets using said control data at the multimedia device.

2. The method of claim 1, wherein said selection command is determined on the basis of a current or future operating state of the server or the source.

3. The method of claim 1, wherein said selection command is stored within a record in a table which is stored by the multimedia device and which can comprise a plurality of records, said record further comprising a channel identifier referring to a program and when the multimedia device receives a conditional access message referring to a specific program, the multimedia device queries the table to find the record comprising the channel identifier corresponding to said program and if the multimedia device finds said record, the multimedia device uses the corresponding selection command stored in said record as a new selection command to be taken into account.

4. The method of claim 1, wherein each control data is obtained, when conditional access messages are processed by the server, by retrieving said control data from a memory in which said control data has been recorded by the server during a previous processing of a same conditional access message, then by securely transmitting said control data to the multimedia device through said IP-connection.

5. The method of claim 1, wherein verifying the authentication of the multimedia device is performed, when conditional access messages are processed by the server, by transmitting the personal identifier of the multimedia device to the server, then checking that said personal identifier is registered at the server as an authorized identifier by querying a database storing all authorized or revoked personal identifiers of multimedia devices.

6. The method of claim 1, wherein verifying the authentication of the multimedia device is performed, when conditional access messages are processed by the server, by joining, to the conditional access messages sent to the server, a digital signature of these messages and a digital certificate belonging to said multimedia device.

7. The method of claim 5, wherein the personal identifier of the multimedia device is stored in said database during a registration stage.

8. The method of claim 7, wherein said personal identifier is transmitted, during said registration stage, from the multimedia device to the server using a communication device connectable to said server.

9. The method of claim 7, wherein said personal identifier is automatically transmitted, during said registration stage, from the multimedia device to the server through said return path.

10. The method of claim 7, wherein said personal identifier is generated by the server and transmitted to the multimedia device through said IP-connection during said registration stage.

11. The method of claim 7, wherein said registration stage is subject to authorization delivered by the server.

12. The method of claim 8, wherein said personal identifier is provided by the multimedia device through a displaying device and then manually transmitted to the server using said communication device.

13. A multimedia device comprising:
   a receiver for receiving a digital stream which includes scrambled audio/video/data content packets and scrambled conditional access messages sent by a source through a wired or wireless network, said conditional access messages containing control data necessary for descrambling said content packets;
   an interface for providing an IP-connection with a return path for connecting said multimedia device to a server;
   a security module configured to process said conditional access messages for extracting said control data;
   a securing device configured to securely transfer data between said multimedia device and said server;
   a transmitter for sending said conditional access messages to a processor, said processor being the server, or the security module;
   a switch for selecting said processor in accordance with a selection command;
   a second receiver for securely receiving said control data from the server through said IP-connection; and
   a descrambler for processing said control data to descramble said content packets;
   wherein said multimedia device or said security module is further configured to generate a selection command, the selection command indicating that the conditional access messages have to be sent to the security module when a connection to the server is not available or is not adequate, and the selection command indicating that the conditional access messages have to be sent to the server when a connection to the security module is not available.

14. The multimedia device of claim 13, wherein said selection command is stored within a record in a table stored by the multimedia device and which can comprise a plurality of records, said record further comprising a channel identifier referring to a program and when the multimedia device receives a conditional access message referring to a specific program, the multimedia device is adapted to query the table to find the record comprising the channel identifier corresponding to said program and if the multimedia device finds the channel identifier corresponding to said program, the multimedia device uses the corresponding selection command stored in this record as a new selection command.

15. The multimedia device of claim 13, wherein said selection command is generated in accordance with a current or future operating state of the server or the broadcaster.

* * * * *